United States Patent
Nakatsugawa et al.

(10) Patent No.: US 6,570,358 B2
(45) Date of Patent: May 27, 2003

(54) CONTROL APPARATUS FOR ALTERNATING-CURRENT MOTOR

(75) Inventors: Junnosuke Nakatsugawa, Hitachi (JP); Tsunehiro Endo, Hitachiota (JP); Hiromi Inaba, Hitachinaka (JP); Yoshitaka Iwaji, Hitachi (JP); Yukio Kawabata, Hitachinaka (JP); Hiroyuki Tomita, Funabashi (JP); Junji Kato, Takaishi (JP)

(73) Assignee: Hitachi, Ltd., Tokyo (JP)

( * ) Notice: Subject to any disclaimer, the term of this patent is extended or adjusted under 35 U.S.C. 154(b) by 37 days.

(21) Appl. No.: 09/981,262

(22) Filed: Oct. 18, 2001

(65) Prior Publication Data

US 2002/0167289 A1 Nov. 14, 2002

(30) Foreign Application Priority Data

May 9, 2001 (JP) ........................................ 2001-138075

(51) Int. Cl.[7] ................................................. H02P 1/24
(52) U.S. Cl. ........................ 318/727; 318/490; 318/805
(58) Field of Search ................................. 318/450, 805, 318/806, 491, 727; 702/67; 324/545

(56) References Cited

U.S. PATENT DOCUMENTS 6,199,023 B1 * 3/2001 Kliman ........................ 702/67

FOREIGN PATENT DOCUMENTS

| JP | 02-032785 | 2/1990 |
| JP | 6-265607 | 9/1994 |
| JP | 2708479 | 10/1997 |
| JP | 2000-270595 | 9/2000 |

* cited by examiner

*Primary Examiner*—Karen Masih
(74) *Attorney, Agent, or Firm*—Crowell & Moring LLP

(57) ABSTRACT

In order to supply an AC motor control apparatus which identifies the type of motor automatically, the AC motor control apparatus has a motor type identification means by which the type of motor connected to the motor control apparatus is identified by issuing the appropriate voltage command for motor type identification and judging from the detected current whether the motor rotor is equipped with a magnet and has magnetic salience. The AC motor control apparatus has a control scheme selection means which selects the appropriate control scheme according to the above-identified type of motor and controls the driving of the motor.

7 Claims, 8 Drawing Sheets

US 6,570,358 B2

CONTROL APPARATUS FOR ALTERNATING-CURRENT MOTOR

BACKGROUND OF THE INVENTION

1. Field of the Invention

The present invention pertains to control apparatus intended for alternating-current motor use; it relates more specifically to control apparatus capable of driving alternating-current motors different in type.

2. Prior Art

Alternating-current motors (hereinafter, referred to as AC motors) are divided into a plurality of types, including an induction type and a synchronous type, according to the particular principles of torque generation. Conventional control apparatus for driving AC motors consists of several units each having the appropriate control scheme according to the particular type of AC motor and each unit is used according to the type of AC motor to be driven. For example, as described in Japanese Application Patent Laid-Open Publication No. Hei 6-265607, when an induction motor (hereinafter, referred to as IM) is to be driven, auto-tuning with an IM driving inverter is provided to measure motor constants automatically for improved torque performance prior to the start of operation. Also, only IM is controlled by a unit generally called the general-purpose inverter, which has versatility with respect to the motor constants of IM.

Among inverter units of the vector control type is a unit constructed so that as disclosed in Patent Official Gazette Issue No. 2708479, the unit can drive an induction motor and asynchronous motor. For this type of unit, however, the types of motors to be driven need to be specified beforehand.

SUMMARY OF THE INVENTION

Recently, new types of motors such as an inserted permanent magnet-type motor (hereinafter, referred to as IPM), a surface-attached permanent magnet-type motor (likewise, referred to as SPM), and a synchronous reluctance motor (likewise, referred to as SynRM), have been developed and commercialized as motors other than IM. Control apparatus for driving and controlling these new motors has also been developed. To drive each such motor, however, it has been necessary to use special control apparatus for each.

An object of the present invention is to supply the method and AC motor control apparatus that enable automatic identification of the types of not only IM but also other AC motors (such as IPM, SPM, and SynRM) that are connected to the apparatus, even if the user does not understand the types of motors. Another object of the present invention is to supply equipment that automatically selects the appropriate motor control schemes for each motor type which has been identified using the above-mentioned method, and drives each motor by using the motor constants that have been obtained during motor type identification, as the settings of the motor constants for conducting variable-speed control of the motor mentioned above.

The AC motor control apparatus pertaining to the present invention has a motor type identification means by which the type of motor connected to the motor control apparatus is identified by issuing the appropriate voltage command for motor type identification and judging from the detected current whether the motor rotor is equipped with a magnet and has magnetic salience. The AC motor control apparatus pertaining to the present invention also has a control scheme selection means which selects the appropriate control scheme according to the above-identified type of motor and controls the driving of the motor.

DETAILED DESCRIPTION OF THE INVENTION (Description of the Preferred Embodiments)

The present invention is described in detail below using drawings.

(Embodiment 1)

Figure 1:
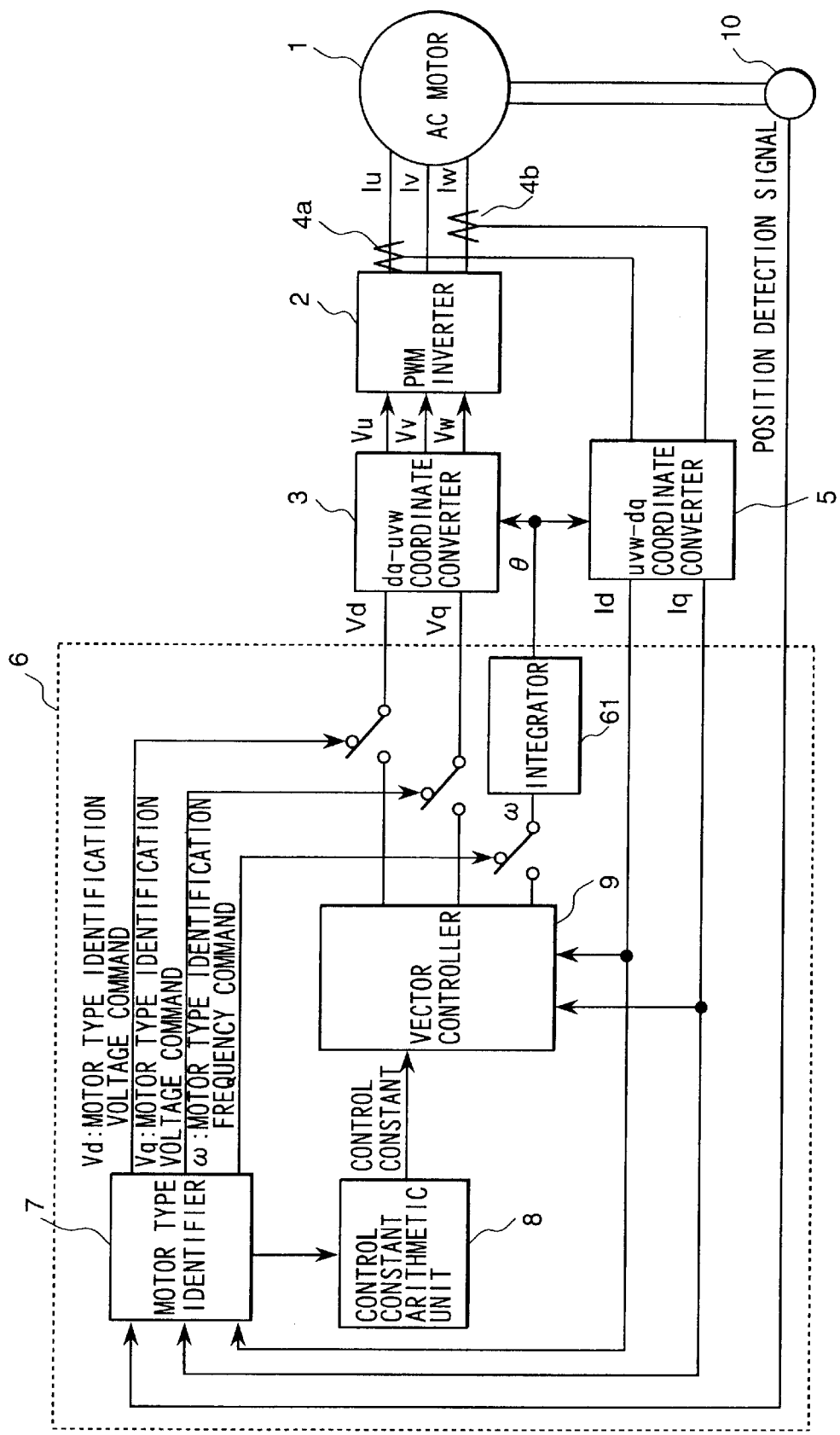
FIG. 1 is a total circuit block diagram of the control circuit used in the AC motor of embodiment 1.

FIG. 1 is a circuit block diagram of an embodiment in which a system for driving an AC motor is driven using a PWM inverter is applied to the present invention.

In FIG. 1, AC motor 1 is the AC unit whose type is to be identified and whose rotor has a position detector 10. AC motor 1 also has a connected PWM inverter 2, which supplies a variable-frequency AC voltage to AC motor 1 in accordance with a PWM signal. Three-phase voltage command signals Vu, Vv, and Vw are created by a dq-uvw coordinate converter 3. This dq-uvw coordinate converter is constructed so as to receive as an input the phase signal θ that has been created from a d-axis voltage command Vd, a q-axis voltage command Vq, and a first-order angular frequency command ω, through an integrator 61, and perform arithmetic operations on three-phase voltage command signals Vu, Vv, and Vw.

A current detector 4a for detecting a U-phase current and a current detector 4b for detecting a W-phase current are provided in the line that connects PWM inverter 2 and AC motor 1, and the currents that have been detected as the outputs from the detectors, are supplied to a uvw-dq coordinate converter 5. This uvw-dq coordinate converter is constructed as a current component creating means for creating, from the detection currents of current detectors 4a and 4b and from the above-mentioned phase signal θ, a d-axis current component Id and a q-axis current component Iq, which correspond to the two axes denoted as the d-axis and the q-axis, respectively. Signals relating to the current components are supplied to a vector control unit 6 provided with a motor type identification function.

Vector control unit 6 has a motor type identifier 7, a control constants arithmetic unit 8, and a vector controller 9. Motor type identifier 7 forms a means for identifying the type of motor on the basis of the current components Id and Iq of uvw-dq coordinate converter 5 and the position detection signal of position detector 10. Motor type identifier 7 is also constructed as a motor type identification command generating means for setting d-axis current component Id, q-axis current component Iq, and first-order angular frequency ω to the respective required values.

Figure 2:
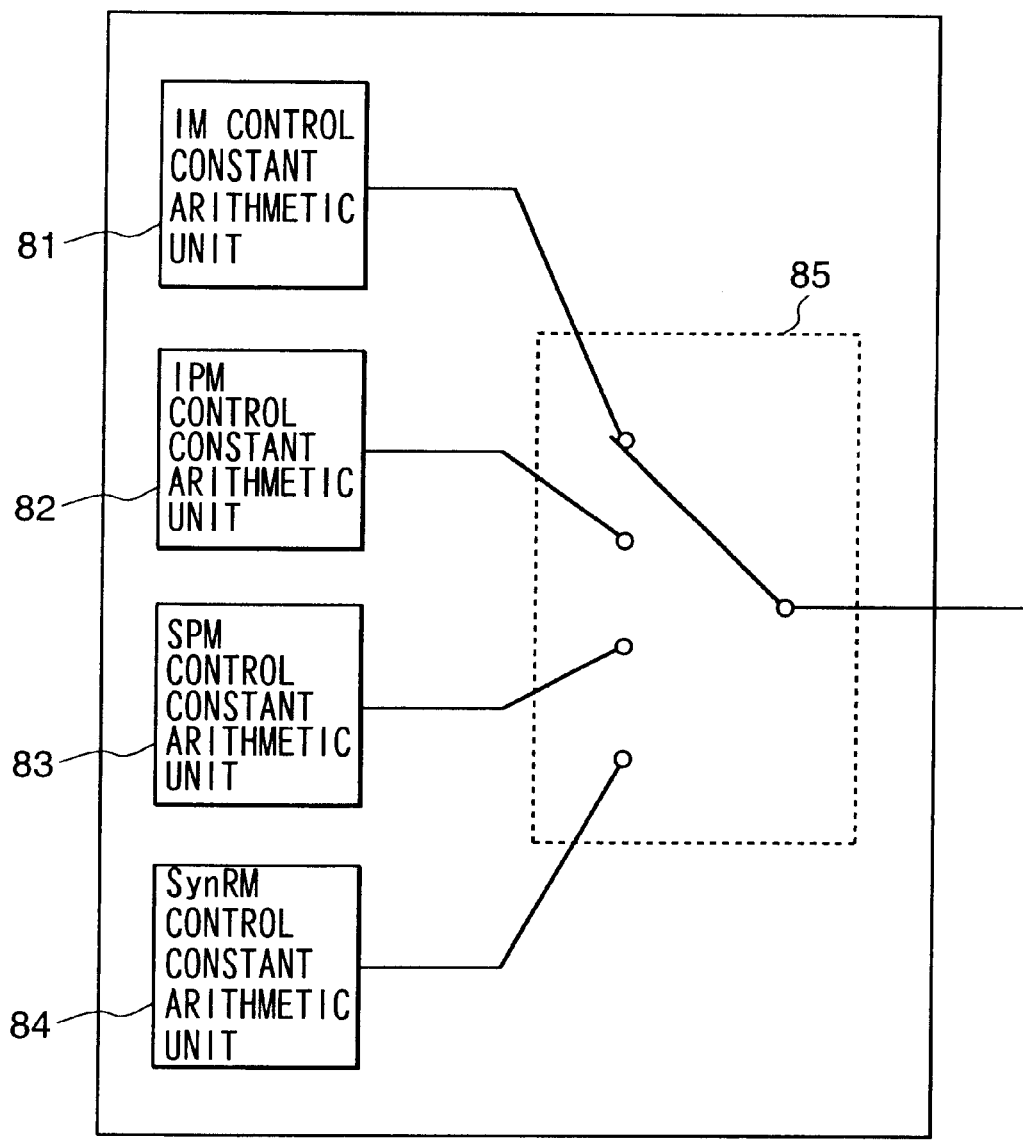
FIG. 2 is a block diagram of the control constants computing circuit used in embodiment 1.

Control constants arithmetic unit 8 computes the control constants of vector controller 9 according to the motor type that has been identified by motor type identifier 7. A block diagram of control constants arithmetic unit 8 is shown as FIG. 2. Control constants arithmetic unit 8 is subdivided into an IM control constants arithmetic unit 81, an IPM control constants arithmetic unit 82, an SPM control constants arithmetic unit 83, a SynRM control constants arithmetic unit 84, and a selector 85 for selecting one of these subsidiary arithmetic units. Control constants arithmetic unit 8 selects one of the multiple subsidiary arithmetic units, depending on the status of a signal from motor type identifier 7, then calculates the appropriate control constant for the motor, and transmits the control constant to vector controller 9.

Figure 3:
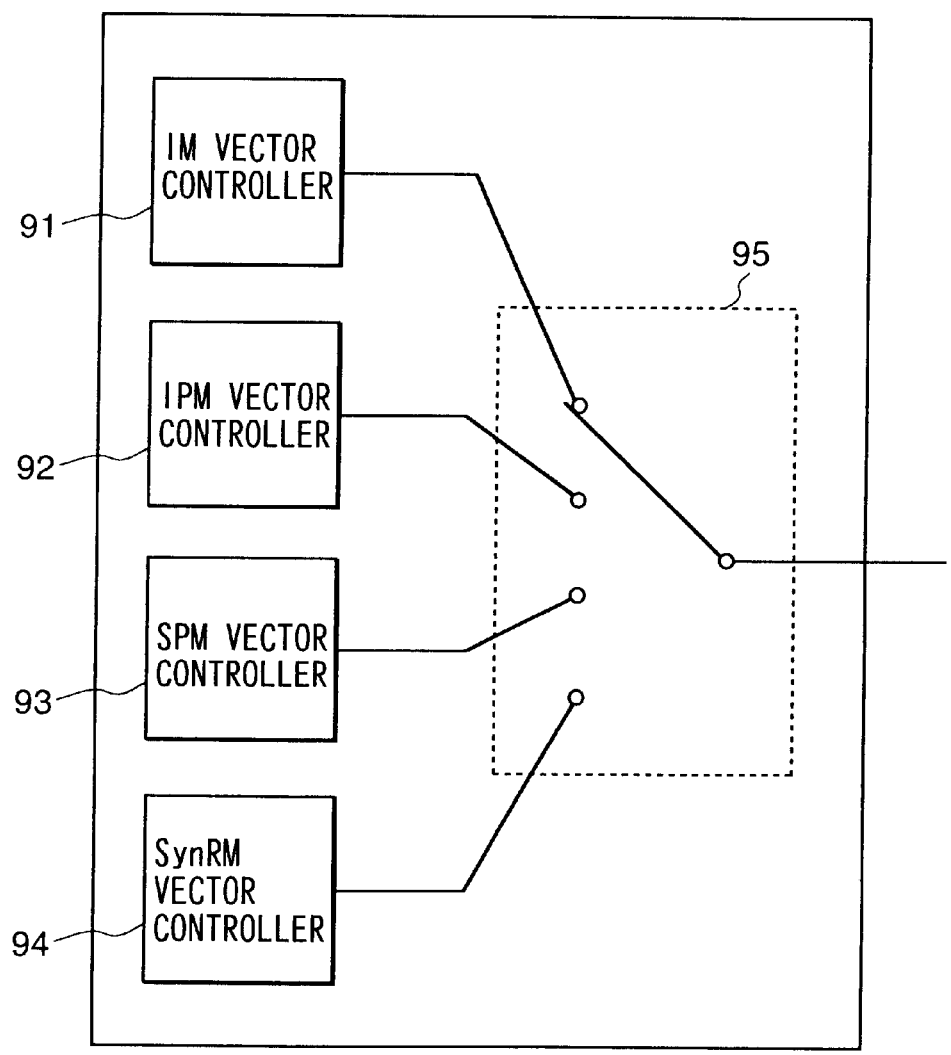
FIG. 3 is an explanatory diagram of the vector controllers used in embodiment 1.

Vector controller 9 controls primary voltage commands Vd and Vq, first-order angular frequency command ω, and other signals, according to the control constant that has been computed by control constants arithmetic unit 8. A block diagram of vector controller 9 is shown as FIG. 3. Vector controller 9 is subdivided into an IM vector controller 91, an IPM vector controller 92, an SPM vector controller 93, a SynRM vector controller 94, and a selector 95 for selecting one of these subsidiary vector controllers. Vector controller 9 selects one of the multiple subsidiary vector controllers, depending on the status of a signal from control constants arithmetic unit 8, then selects the appropriate control scheme according to the type of motor to be controlled, and issues the corresponding control command. In this embodiment, after vector controller 9 has been disconnected during motor type identification, motor type identification voltage commands Vd and Vq and first-order angular frequency command ω are assigned from motor type identifier 7 to dq-uvw converter 3.

Figure 4:
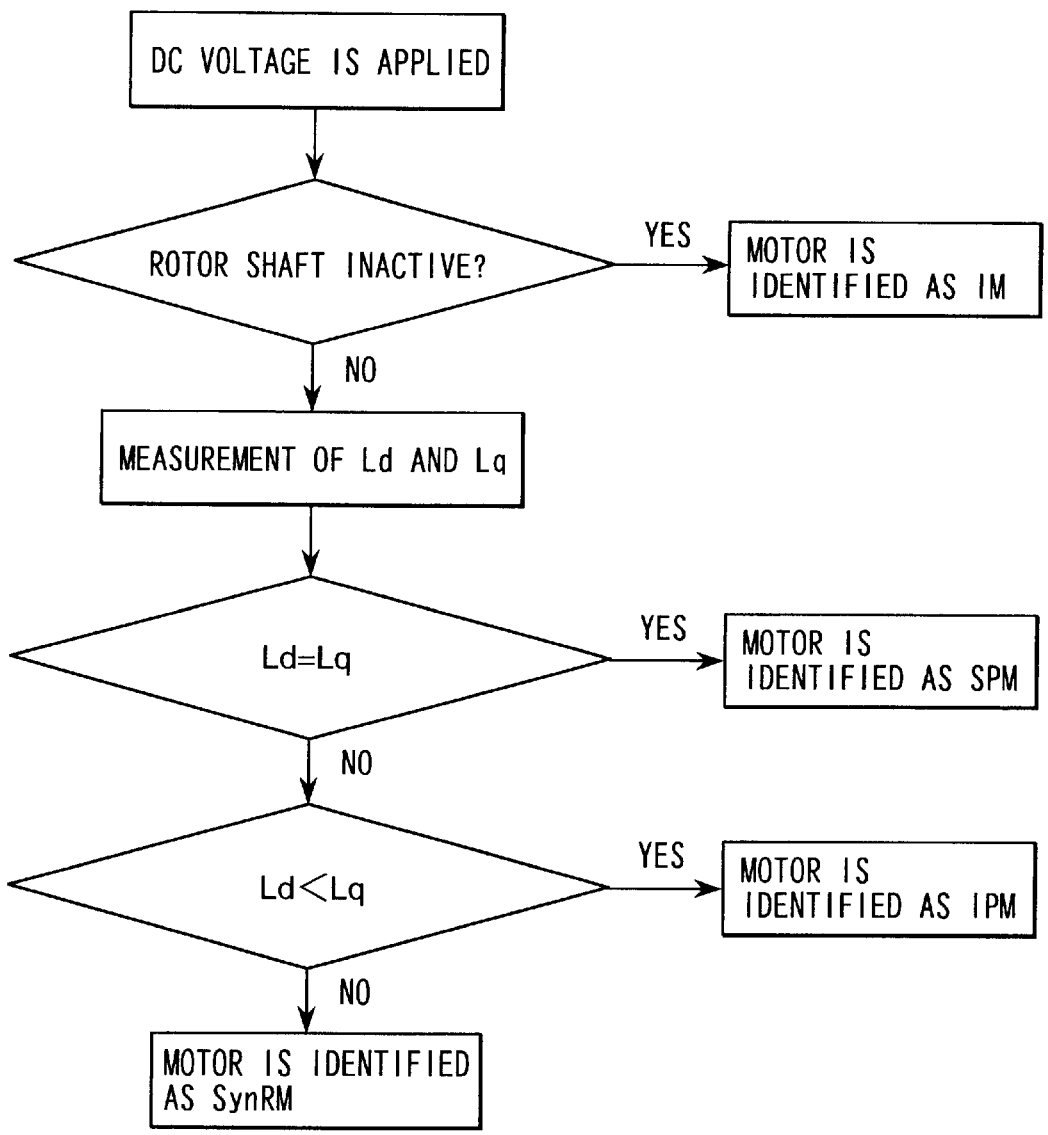
FIG. 4 is a flowchart of AC motor identification in embodiment 1.

A flowchart of the motor identification method used in this embodiment is shown as FIG. 4. Description of operation, based on this flowchart, is given below. First, a DC voltage high enough for the AC motor to rotate its rotor is applied and the operation of the rotor is monitored according to the status of a position detection signal from position detector 10. At this time, if the rotor does not operate, the motor can be judged not to use a magnet in the rotor, and thus identified as IM not having magnetic salience in the shape of the rotor. If the rotor operates, it can be estimated that the motor is either a magnet motor whose rotor uses a magnet, or a reluctance motor provided with magnetic salience in the shape of the rotor. However, the phase where the DC voltage has been applied may happen to become a phase in which a torque does not occur. In actuality, therefore, the DC voltage is applied in at least two types of phases. In this way, it can be judged whether the motor is IM, by applying a DC voltage to the AC motor and monitoring the operation of the rotor by use of the rotor position detection means. If the motor is found to be IM, the motor constants for IM will be calculated using auto-tuning technology intended to measure known motor constants, and then IM will be controlled properly.

If the fact that the rotor has operated is confirmed using the identification method described above, that is to say, if the motor has been identified as IM, the rotor is positioned and since the identification means matching between the current phase where the DC voltage was applied and the phase of the direct axis (d-axis) of the rotor, the d-axis phase itself of the rotor is identified.

Next, the inductance of the d-axis identified above (hereinafter, this axis is referred to as Ld) and the inductance of the q-axis which is orthogonal to the d-axis and has advanced by 90 degrees in electrical phase angle (hereinafter, this axis is referred to as Lq) are measured. A multitude of methods are available to calculate inductances. One such method is, as disclosed in Japanese Application Patent Laid-Open Publication No. Hei 07-244099, by modulating the output voltage signal of an inverter into a rectangular waveform at high frequency and measuring the then rate of change of current.

After Ld and Lq have been measured using the above method, the type of motor is identified from the relationship in magnitude between the measured values. If Ld=Lq, the motor is SPM; if Ld<Lq, the motor is IPM, or; if Ld>Lq, the motor is SynRM.

After SPM, IPM, or SynRM identification with the above method, the Ld and Lq values that have been used for the identification are used as the motor control constants to control the motor.

(Embodiment 2)

Figure 5:
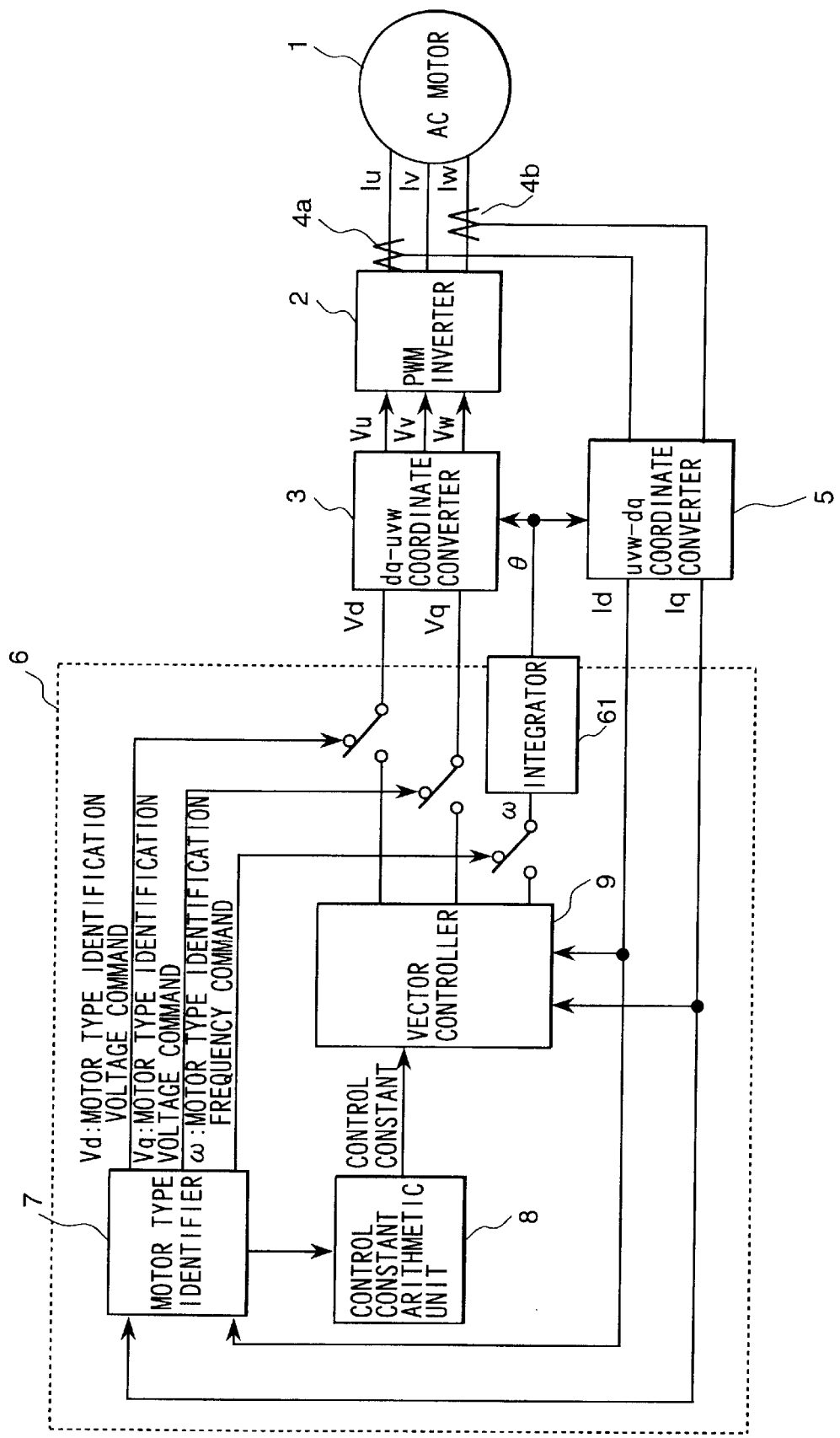
FIG. 5 is a total circuit block diagram of the control circuit used in the AC motor of embodiment 2.

FIG. 5 is a circuit block diagram relating to this embodiment, and differs from FIG. 1 of embodiment 1 in that position detector 10 for detecting the rotational position of the rotor of AC motor 1 is not provided. That is to say, in embodiment 2, a position detection means is not used and the type of motor is identified without a position sensor. In other words, since the type of motor is identified without the motor rotating, this embodiment is suitable for applications in which the rotor of the motor must not operate during motor identification.

Figure 6:
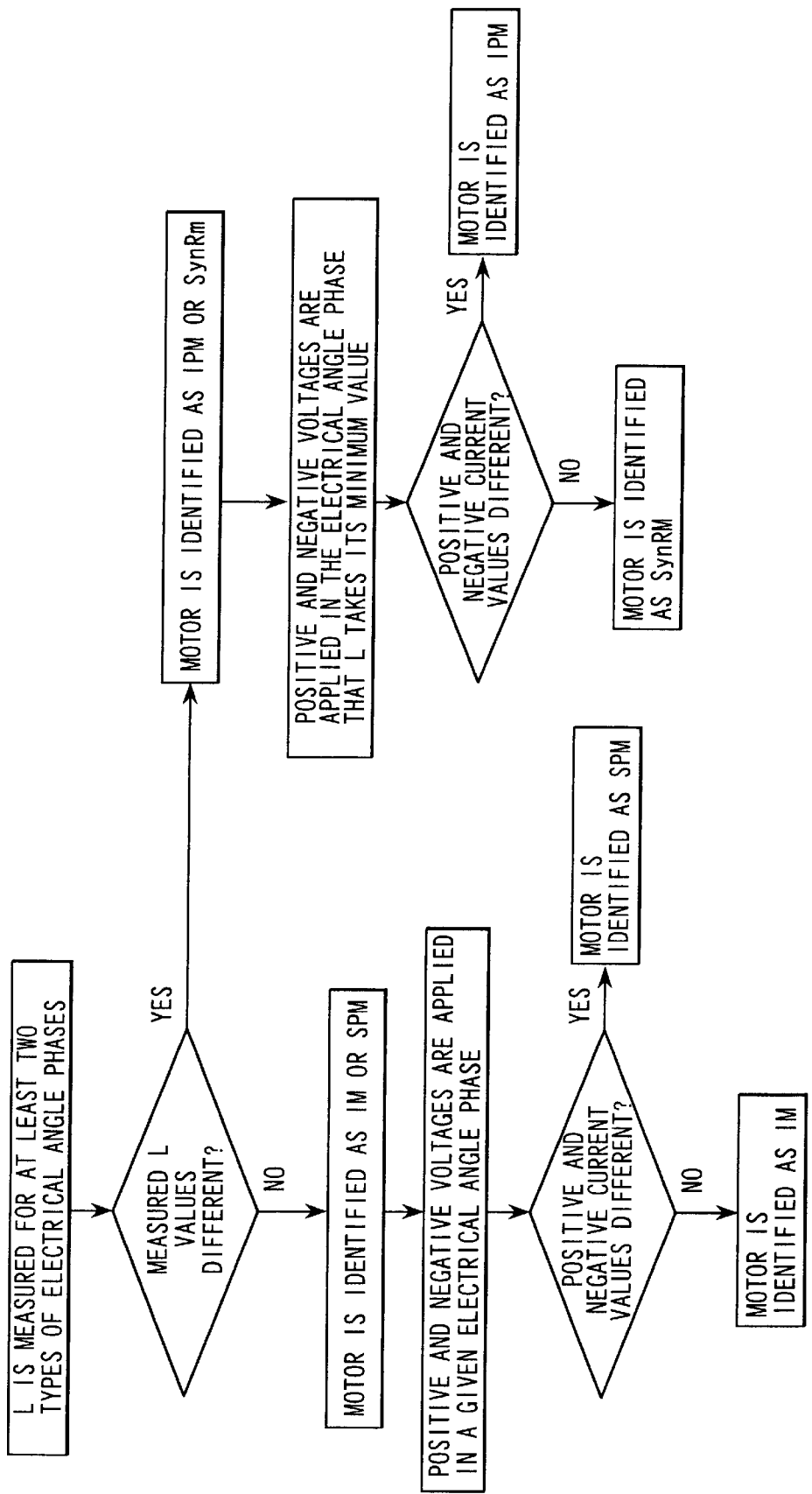
FIG. 6 is a flowchart of AC motor identification in embodiment 2.

A flowchart of this embodiment is shown as FIG. 6. First, inductance is measured to the AC motor with respect to at least two types of electrical angle phases. At this time, if measured inductance values differ, the motor can be identified as either IPM or SynRM provided with magnetic salience in the shape of the rotor. If the measured inductance values do not differ, the motor can be identified as either IM or SPM not provided with magnetic salience in the shape of the rotor. The type of motor can likewise be identified by assigning voltage changes with respect to at least two types of electrical angle phases and measuring the corresponding rate of change of current or the time constants of the motor, instead of measuring inductance. If there is a difference in the measured rate of change of current or between the motor time constants, the motor can be identified as either IPM or SynRM provided with magnetic salience in the shape of the rotor. If there is no difference in the measured rate of change of current or between the motor time constants, the motor can be identified as either IM or SPM not provided with magnetic salience in the shape of the rotor.

The above identification of IPM or SynRM is followed by motor identification that uses magnetic saturation. If the rotor uses a magnet, when a current is supplied by applying a voltage in the direction that the intensity of the magnetic fluxes generated by the magnet increases, magnetic saturation will occur and the resulting decrease in inductance will increase the current. Conversely, if a current is supplied by applying a voltage in the direction that the intensity of the magnetic fluxes generated by the magnet decreases, magnetic saturation will not occur and inductance will not increase, either. For IPM, the d-axis has a magnet and the value of Ld is less than that of Lq. Therefore, when a positive voltage and a negative voltage are applied in the phase smallest in inductance among all the multiple types of phases in which inductance was measured, if there is a difference between the resulting positive and negative currents, the motor can be identified as IPM whose rotor uses a magnet. Conversely, if there is no difference between the resulting positive and negative currents, the motor can be identified as SynRM whose rotor does not use a magnet.

After the motor has been identified as either IM or SPM from inductance measurement results, when a positive voltage and a negative voltage are applied in a given phase, if there is a difference between the resulting positive and negative currents, the motor can be identified as SPM whose rotor uses a magnet. The identification is based on magnetic saturation as described earlier in this document. Conversely, if there is no difference between the resulting positive and negative currents, the motor can be identified as IM whose rotor does not use a magnet. However, when the above measurement is conducted for one phase, if there happens to be a phase shift of 90 degrees in electrical angle with respect to the axis of the magnet, more accurate measurement becomes possible by further shifting the phase, since the application of positive and negative voltages may not result in magnetic saturation occurring even if the rotor uses a magnet.

After IM, SPM, IPM, or SynRM identification with the above method, the Ld and Lq values that have been used for the identification are used as the motor control constants to control the motor.

(Embodiment 3)

Description is given of an embodiment 3 which, as with embodiment 2 above, uses a position sensorless identification method to identify the type of motor. The circuit block diagram in FIG. 5 is almost the same as that of FIG. 5. Embodiment 3 differs from embodiment 2 in that a judgment of whether the rotor of the motor uses a magnet is made first and then a judgment of whether the rotor has magnetic salience is conducted.

Figure 7:
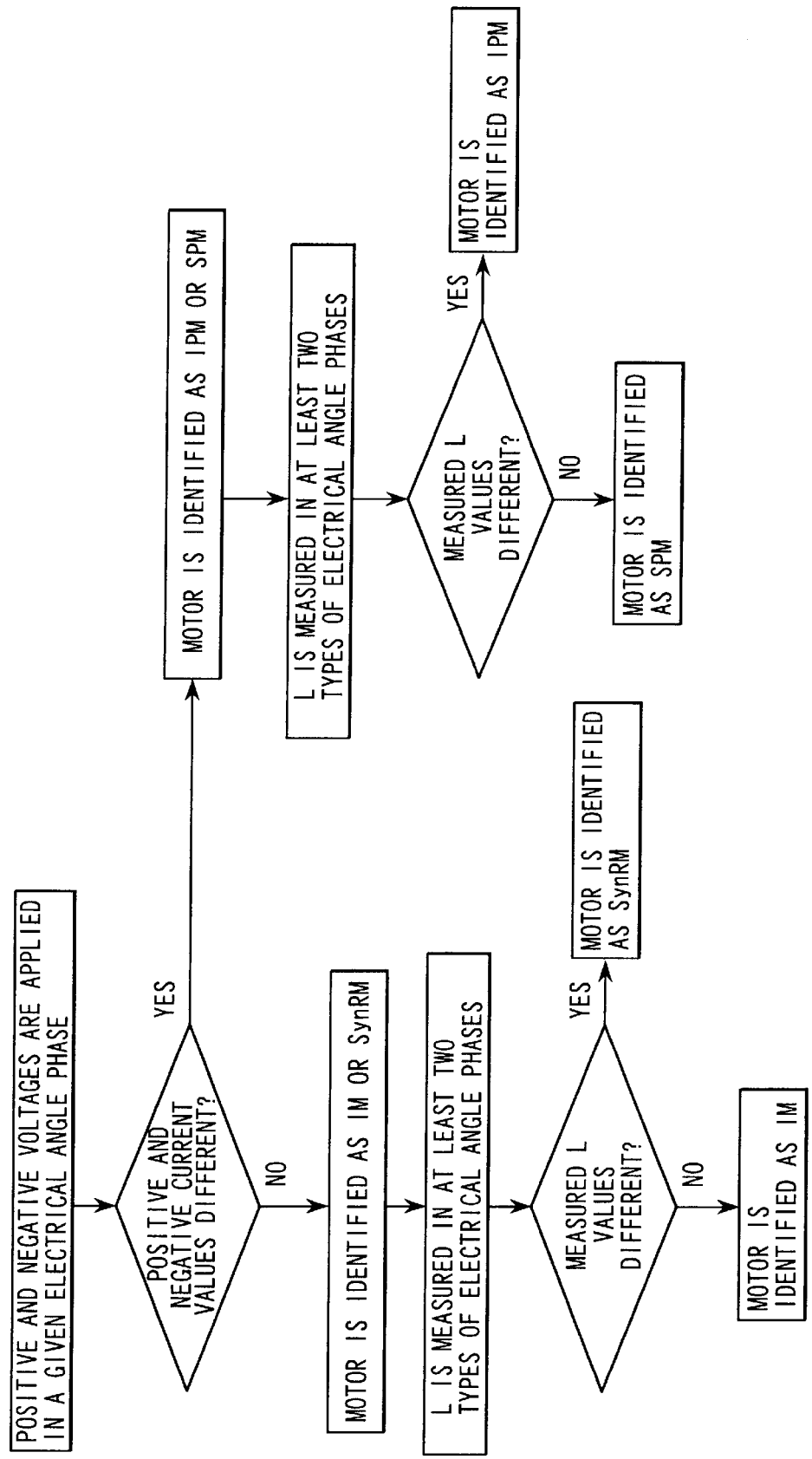
FIG. 7 is a flowchart of AC motor identification in embodiment 3.

A flowchart of this embodiment is shown as FIG. 7. First, when a positive voltage and a negative voltage are applied to the AC motor in a given electrical angle phase, if there is a difference between the resulting positive and negative currents, the motor can be identified as either SPM or IPM whose rotor uses a magnet. Conversely, if there is no difference between the resulting positive and negative currents, the motor can be identified as either IM or SynRM whose rotor does not use a magnet. However, when the above measurement is conducted for one phase, if there happens to be a phase shift of 90 degrees in electrical angle with respect to the axis of the magnet, more accurate measurement becomes possible by further shifting the phase, since the application of positive and negative voltages may not result in magnetic saturation occurring even if the rotor uses a magnet.

Next, inductance is measured with respect to at least two types of electrical angle phases. At this time, if, as in embodiment 2, there is a difference in measured inductance, the motor can be identified as either IPM or SynRM provided with magnetic salience in the shape of the rotor. If there is no difference in the measured inductance, the motor can be identified as either IM or SPM not provided with magnetic salience in the shape of the rotor.

Therefore, when the identification of the motor type in which the rotor uses a magnet is followed by inductance measurement, if there is a difference in measured inductance, the motor can be identified as IPM, or if there is no difference in the measured inductance, the motor can be identified as SPM. Conversely, when the identification of the motor type in which the rotor does not use a magnet is followed by inductance measurement, if there is a difference in measured inductance, the motor can be identified as SynRM, or if there is no difference in the measured inductance, the motor can be identified as IM. The identification in that case can be conducted by measuring the rate of change of current or the motor time constants, instead of measuring inductance.

After IM, SPM, IPM, or SynRM identification with the above method, the Ld and Lq values that have been used for the identification are used as the motor control constants to control the motor.

(Embodiment 4)

Figure 8:
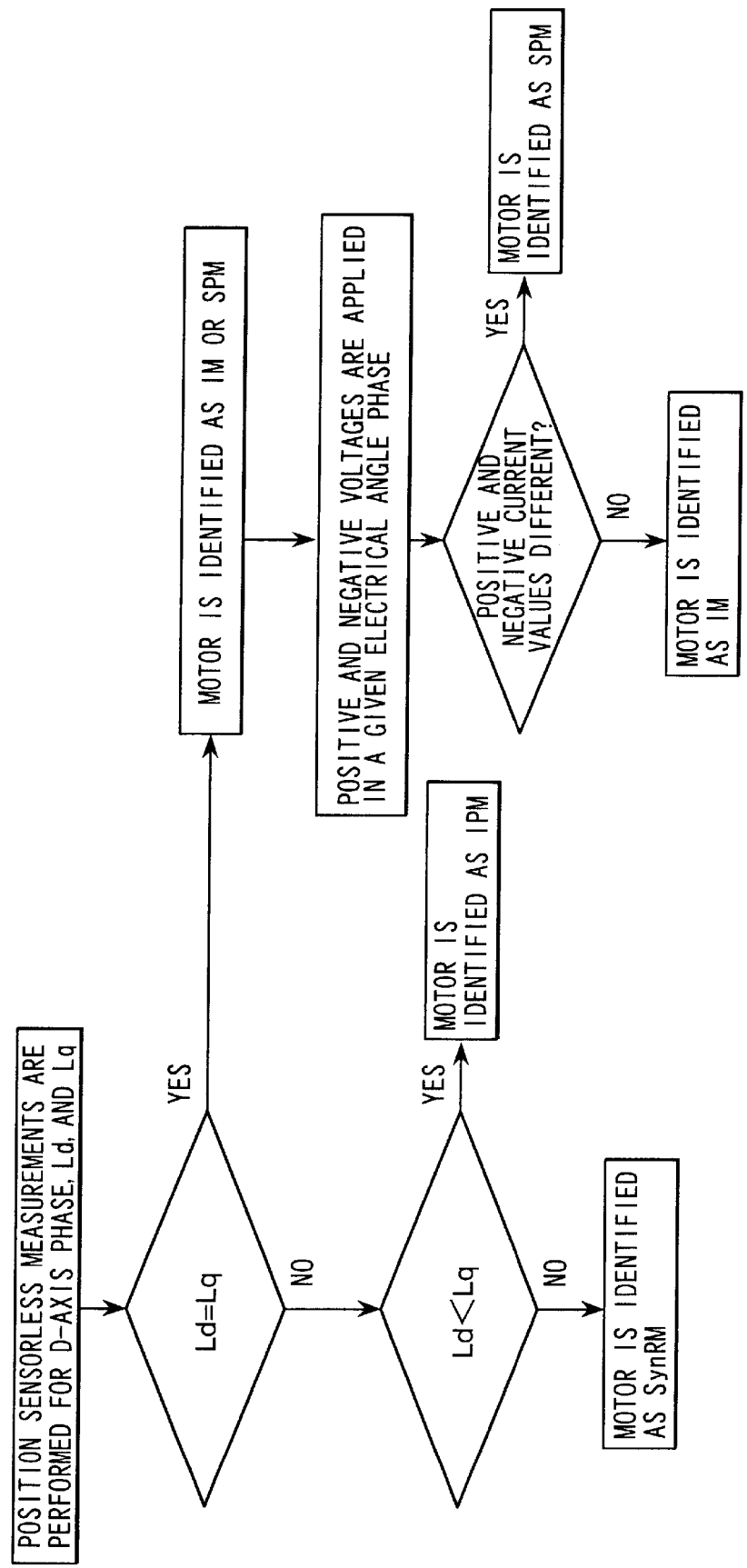
FIG. 8 is a flowchart of AC motor identification in embodiment 4.

The circuit block diagram of this embodiment is much the same as the circuit block diagram of FIG. 5. A flowchart of this embodiment is shown as FIG. 8. First, Ld and Lq are measured without a position sensor with respect to the AC motor. The methods of measuring Ld and Lq include one, as disclosed in Japanese Application Patent Laid-Open Publication No. Hei 06-315291, by which Ld and Lq are to be estimated by first applying an AC voltage in a given electrical angle phase and measuring inductance, then applying an AC voltage in a phase shifted through an electrical angle of 45 degrees phase in forward and reverse directions from the first angle position, and measuring inductance at the three angle positions. The type of motor is to be identified from the relationship in magnitude between the measured Ld and Lq values. In this respect, embodiment 4 differs from embodiments 2 and 3.

If Ld=Lq, the motor can be identified as IM or SPM; if Ld<Lq, the motor can be identified as IPM, or; if Ld>Lq, the motor can be identified as SynRM.

After the above identification of IM or SPM, when a positive voltage and a negative voltage are applied in a given electrical angle phase, if there is a difference between the corresponding positive and negative currents, the motor can be identified as SPM whose rotor uses a magnet. Conversely, if there is no difference between the corresponding positive and negative currents, the motor can be identified as IM whose rotor does not use a magnet. However, when the above measurement is conducted for one phase, if there happens to be a phase shift of 90 degrees in electrical angle with respect to the axis of the magnet, more accurate measurement becomes possible by further shifting the phase, since the application of positive and negative voltages may not result in magnetic saturation occurring even if the rotor uses a magnet.

After IM, SPM, IPM, or SynRM identification with the above method, the Ld and Lq values that have been used for the identification are used as the motor control constants to control the motor.

What is claimed is:

1. Alternating-current motor driving equipment having an inverter for converting a direct-current voltage into an alternating current or a direct current and supplying the current to an alternating-current motor, and
control apparatus for controlling the magnitude and frequency of the output voltage of said inverter,
wherein said control apparatus is characterized in that the apparatus itself has a means for identifying the type of alternating-current motor connected to said inverter.

2. Alternating-current motor control apparatus as set forth in claim 1 above, wherein said control apparatus is characterized in that it has a motor control means and a control constant computing means and in that the control constants to be used for said motor control means are computed by said control constant computing means according to the type of motor that has been identified by said motor type identification means.

3. Alternating-current motor control apparatus as set forth in claim 1 above, wherein said control apparatus is characterized in that it has a plurality of means for controlling a plurality of motors and selects one of said multiple motor control means according to the type of motor that has been identified by said motor type identification means.

4. Alternating-current motor control apparatus as set forth in claim 1 above, wherein said control apparatus is characterized in that said driving equipment has a means for detecting the rotational speed of said alternating-current motor and in that said motor type identification means includes a means for measuring the inductance of said alternating-current motor and applies a voltage to said alternating-current motor and identifies the type of this motor by the rotational speed information sent from said rotational speed detection means or by the inductance information sent from said inductance measuring means.

5. Alternating-current motor control apparatus as set forth in claim 1 above, wherein said motor type identification means is characterized in that it includes an inductance measuring means or a current change detection means or a motor time constant measuring means, applies voltage changes to said alternating-current motor at two types or more of electrical angle phases, and identifies the type of alternating-current motor by comparison results on either the inductances corresponding to said multiple types of electrical angle phases which have been measured by said inductance measuring means, the rates of change of current corresponding to said multiple types of electrical angle phases which have been measured by said current change detection means, or the time constants corresponding to said multiple types of electrical angle phases which have been measured by said motor time constant measuring means.

6. Alternating-current motor control apparatus as set forth in claim 1 above, wherein said control apparatus is characterized in that it includes a motor current detection means and in that after the corresponding motor current detection value has been entered into said motor type identification means, the type of said alternating-current motor is identified from the difference between the current value obtained by applying a positive voltage to said alternating-current motor, and the current value obtained by applying a negative voltage to said alternating-current motor.

7. Alternating-current motor control apparatus as set forth in claim 1 above, wherein said motor type identification means is characterized in that it includes a means for measuring the particular change in inductance with respect to the rotor position and identifies the type of said alternating-current motor according to the measured change in inductance with respect to the corresponding rotor position.

* * * * *